United States Patent [19]

Piche

[11] 4,031,933
[45] June 28, 1977

[54] TENON CUTTING MACHINE WITH CIRCULAR SAWS

[76] Inventor: Ernest Piche, 2 Forget St., St. Agathe, Canada

[22] Filed: Oct. 21, 1976

[21] Appl. No.: 734,737

[52] U.S. Cl. .................................. 144/198 R; 83/3; 83/471.2; 83/472; 83/483; 83/496; 144/1 R; 144/136 R; 144/323; 144/326 R

[51] Int. Cl.² ........................................ B27F 1/08

[58] Field of Search ....... 144/198 R, 134 R, 136 R, 144/114 R, 1 R, 3 R, 218, 219, 229, 312, 321, 323, 326 R; 83/3, 471, 471.1, 471.2, 471.3, 472, 483, 484, 485, 495, 496

[56] References Cited

UNITED STATES PATENTS

| 861,735 | 7/1907 | Klein | 83/472 X |
|---|---|---|---|
| 2,344,003 | 3/1944 | Skeptinsky | 83/472 X |
| 2,918,950 | 12/1959 | LeTarte | 83/471.3 |
| R6,682 | 10/1875 | Morgan et al. | 83/3 X |

FOREIGN PATENTS OR APPLICATIONS

| 659,179 | 3/1938 | Germany | 83/483 |
| 688,184 | 1/1940 | Germany | 83/472 |
| 548,244 | 9/1956 | Italy | 144/198 R |

*Primary Examiner*—Othell M. Simpson
*Assistant Examiner*—W. D. Bray

[57] ABSTRACT

A cutting machine to form a tenon at each end of a piece of timber, which tenon has opposite faces which are inclined both longitudinally and transversely relative to the piece of timber and form hereinafter called skew tenon faces. This tenon cutting machine is of simple and inexpensive construction and uses a pair of circular saws which are simply arranged angularly relative to each other and to the piece of timber to produce both skew tenon faces at each end of the piece of timber by simple bodily displacement of the circular saws transversely of the piece of timber. This machine includes a carriage displaceable in a predetermined direction and carrying the two circular saws, a timber carrying bench to place the piece of timber lengthwise orthogonally to this direction and laterally slanted either way in this direction. The displacement of the carriage causes the saws to cut the two surfaces respectively which are required on either side of the tenon.

5 Claims, 6 Drawing Figures

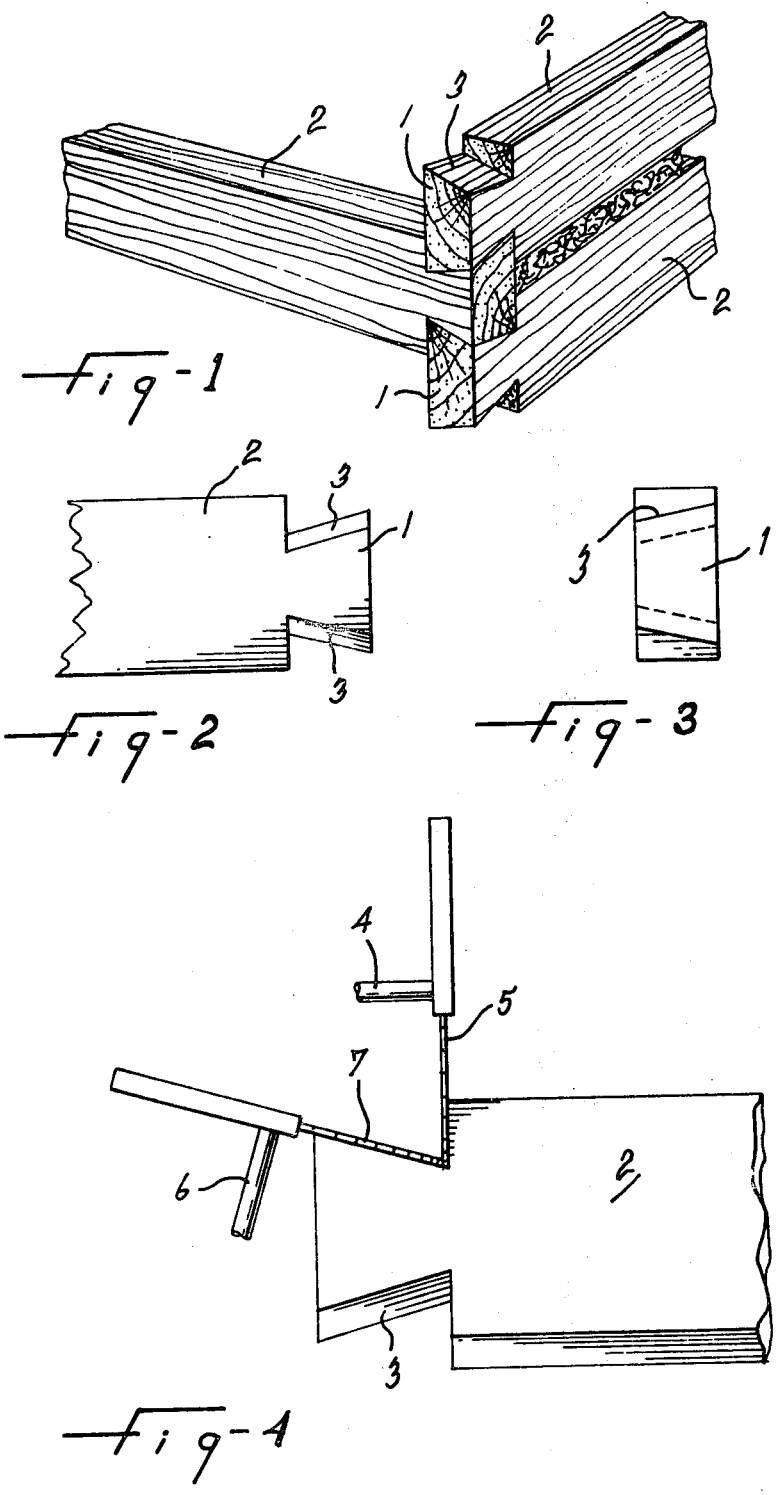

TENON CUTTING MACHINE WITH CIRCULAR SAWS

This invention relates to a tenon cutting machine of the type adapted to cut skew tenon faces on timber.

It has been proposed to make buildings and, in particular, the walls of buildings with solid pieces of timber wherein special tenon joints hold the pieces one to another. Such special tenon joint, as hereinafter illustrated and described, is formed by identical interlocking tenons each on one end of cooperating pieces of timber. This tenon includes a pair of laterally opposite tenon faces which are inclined longitudinally but also transversely at the same angle relative to the piece of timber. These doubly inclined tenon faces are hereinafter identified as skew tenon faces. The two skew tenon faces at each end of any piece of timber are transversely inclined convergingly relative to each other and toward a mutual axis of transverse convergence.

It is a general object of the present invention to provide a tenon cutting machine for skew tenon faces which is of simple construction and operation and reliably produces the desired skew tenon faces.

It is another object of the present invention to provide a tenon cutting machine for skew tenon faces which uses a simple and inexpensive arrangement of two circular saws and simple bodily displacement of the latter transversely of a piece of timber to produce the desired skew tenon faces.

It is a further object of the present invention to provide a tenon cutting machine for skew tenon faces wherein the combined and simple relative angular positioning of two circular saws and the piece of timber allow to rapidly and reliably cut an afore-mentioned skew tenon face by a simple and single bodily displacement of the saws across the piece of timber.

The above and other objects and advantages of the present invention will be better understood with reference to the following detailed description of a preferred embodiment thereof which is illustrated, by way of example, in the accompanying drawings, in which:

FIG. 1 is a perspective view of a tenon joint formed with pieces of timber having each a tenon which can be made with a tenon cutting machine according to the present invention;

FIGS. 2 and 3 are front and end views respectively of a tenon made with the hereinafter described tenon cutting machine;

FIG. 4 is a front view of a tenon being cut by the two circular saw blades of the hereinafter defined tenon cutting machine;

The tenon which is referred to herein is a single tenon 1 at each end of a piece of timber 2 and characterized by a pair of skew tenon faces 3 on opposite sides of the tenon. These so-called skew tenon faces 3 have a double inclination longitudinally and transversely of the piece of timber. The transverse inclination or skew of each skew tenon face is such that the opposite skew tenon faces of each tenon converge toward each other transversely of piece of timber. Moreover, the skew or transverse inclination and the longitudinal inclination have the same angle to form a tight joint, as shown in FIG. 1, between two tenons superposed at 90° to each other.

Figure 5:
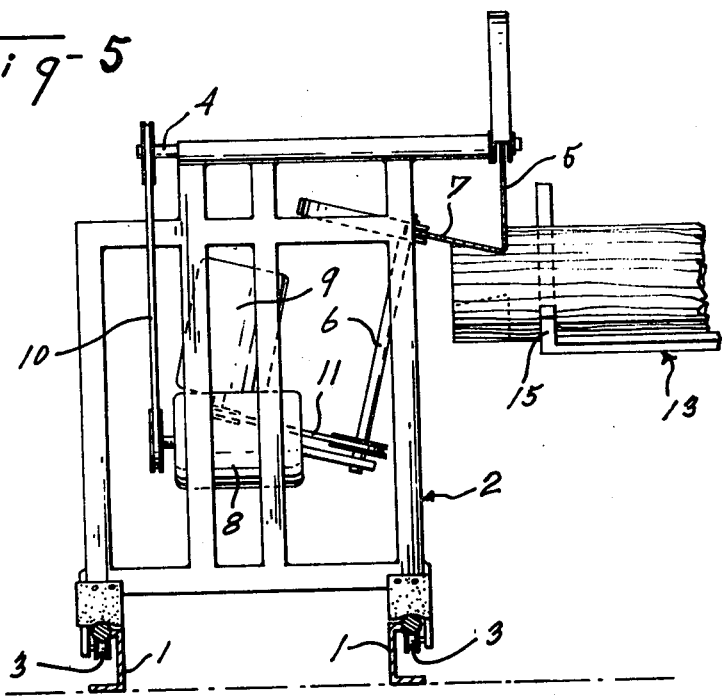
FIG. 5 is a front view of the tenon cutting machine according to the preferred embodiment of the present invention.
Figure 6:
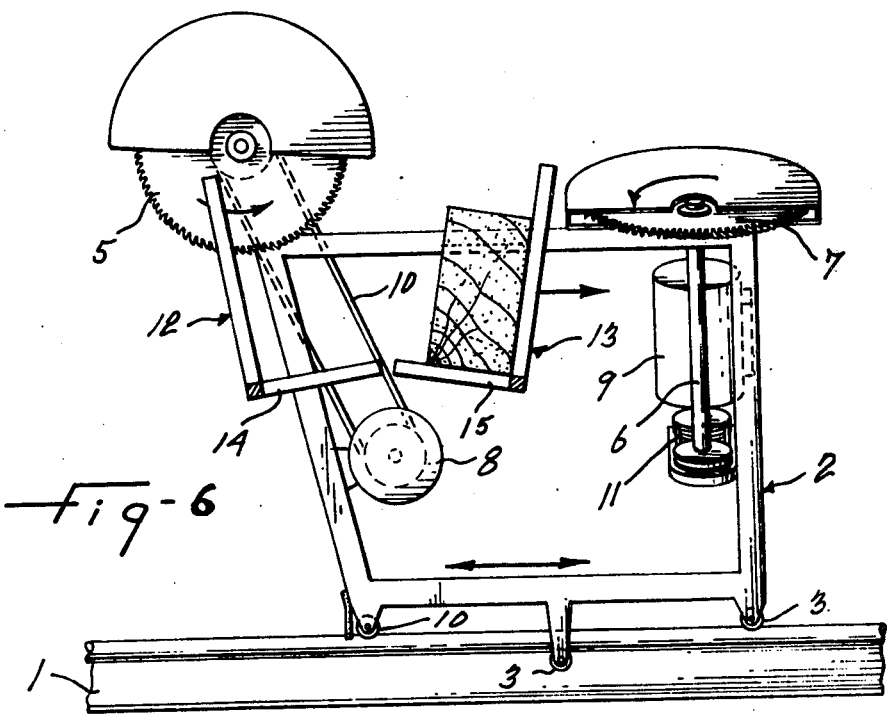
FIG. 6 is a side view of the machine of FIG. 5.

The tenon cutting machine according to the present invention and illustrated in FIGS. 5 and 6 includes a pair of rails 1,1 running parallel to each other in a predetermined direction. A carriage 2, in the form of a framework, is provided with wheels 3 to run on the rails 1, 1.

A first shaft 4 extends lengthwise transversely of the carriage 2 and has one end projecting on one side of the latter. A first circular saw blade 5 is fixed to this one end of the transverse shaft 4 to bodily rotate with the latter in an upright plane extending in the afore-mentioned predetermined direction. A second shaft 6 is rotatably mounted on the carriage 2 and is inclined upwardly and outwardly toward the afore-mentioned side of the carriage. A second circular saw blade 7 is mounted on the upper end of the inclined shaft 6 to bodily rotate therewith in an inclined plane defined by the inclination of the shaft 6 and defining the afore-mentioned longitudinal inclination of a skew tenon face, as can be seen in FIGS. 4 and 5.

The shafts 4 and 6 are driven by the motors 8 and 9 respectively appropriately connected to these shafts by belts 10 and 11 and by pulleys.

A timber-carrying bench is positioned adjacent the carriage 2 and includes a pair of timber carrying cradles 12 and 13 adapted to each support of a piece of timber 2 lengthwise orthogonally to the afore-described predetermined direction and to the plane of the first circular saw blade 5 and such that one end of the piece of timber extends in the path of travel of the saw blades 5 and 7. The timber carrying cradles have base portions 14 and 15 respectively which are inclined at the skew angle and in opposite directions relative to each other lengthwise of the predetermined direction to support a piece of timber successively in two laterally slanted positions, as shown in FIGS. 4, 5, and 6, to form the skew angle of the two opposite skew tenon faces respectively.

It may thus be understood that the lateral slanting of the piece of timber on each cradle allows to cut the skew tenon face upon bodily displacement of the saw blade 7 with the carriage 2 while the saw blade 5 cuts the transverse face. The positioning of the piece of timber successively on the two cradles 12 and 13 with 180° rotation of the piece of timber on itself from one cradle to the other, allows to cut the laterally opposite skew tenon faces respectively.

I claim:

1. A tenon cutting machine for cutting skew tenon faces at an end of a piece of timber, comprising a carriage reciprocatively displaceable in a predetermined direction, a timber carrying bench operatively holding a piece of timber in a direction lengthwise orthogonally to said predetermined direction, said bench being laterally slanted in said direction at a predetermined angle of skew transversely of the piece of timber, a first circular saw blade rotatively mounted on said carriage and displaceable therewith in said predetermined direction and extending in a plane orthogonally intersecting said piece of timber at one end thereof and parallel to said predetermined direction, a second circular saw blade rotatively mounted on said carriage and displaceable therewith in said predetermined direction, said second circular saw blade extending in a plane longitudinally inclined relative to the piece of timber and intersecting said one end thereof at the longitudinal tenon angle of the desired skew tenon faces, and drive means connected to said saw blades and operatively rotating the latter for cutting into said one end of the piece of timber upon bodily displacement of said saw blades and carriage in said predetermined direction.

2. A tenon cutting machine as defined in claim 1, for successively cutting two opposite skew tenon faces at an end of a piece of timber, wherein said timber carrying bench includes a pair of timber carrying cradles having base portions respectively inclined at said skew angle and in opposite directions relative to each other lengthwise of said predetermined direction thereby supporting a piece of timber successively in two laterally slanted positions defining the skew angle of the two opposite skew tenon faces, respectively.

3. A tenon cutting machine as defined in claim 1, wherein the angle of longitudinal inclination of said second circular saw blade is the same as said predetermined angle of skew.

4. A tenon cutting machine as defined in claim 1, wherein a pair of parallel rails extend lengthwise in said predetermined direction and said carriage includes wheels guidably running on said rails and cooperatively allowing displacement of the carriage in said predetermined direction.

5. A tenon cutting machine as defined in claim 2, wherein the angle of longitudinal inclination of said second circular saw blade is the same as said predetermined angle of skew, a pair of parallel rails extending lengthwise in said predetermined direction, and said carriage includes wheels guidably running on said rails and cooperatively allowing displacement of the carriage in said predetermined direction.

* * * * *